(12) United States Patent
Kucera

(10) Patent No.: US 9,469,255 B2
(45) Date of Patent: Oct. 18, 2016

(54) MONITOR-MOUNTING SYSTEM FOR A LAND VEHICLE HEADREST

(71) Applicant: Rosen Electronics, LLC, Clearwater, FL (US)

(72) Inventor: Curtis C. Kucera, Temecula, CA (US)

(73) Assignee: ROSEN ELECTRONICS, LLC, Clearwater, FL (US)

( * ) Notice: Subject to any disclaimer, the term of this patent is extended or adjusted under 35 U.S.C. 154(b) by 0 days.

(21) Appl. No.: 14/320,270

(22) Filed: Jun. 30, 2014

(65) Prior Publication Data

US 2014/0312665 A1 Oct. 23, 2014

Related U.S. Application Data

(63) Continuation of application No. 14/076,683, filed on Nov. 11, 2013, now abandoned, which is a continuation of application No. 13/743,138, filed on Jan. 16, 2013, now abandoned, which is a continuation of application No. 12/939,162, filed on Nov. 3, 2010, now abandoned.

(60) Provisional application No. 61/257,780, filed on Nov. 3, 2009, provisional application No. 61/257,777, filed on Nov. 3, 2009.

(51) Int. Cl.
| | |
|---|---|
| *B60R 7/00* | (2006.01) |
| *B62J 7/00* | (2006.01) |
| *B62J 9/00* | (2006.01) |
| *B60R 11/02* | (2006.01) |
| *B60N 2/48* | (2006.01) |
| *B60R 11/00* | (2006.01) |

(52) U.S. Cl.
CPC ......... *B60R 11/0229* (2013.01); *B60N 2/4876* (2013.01); *B60R 11/0235* (2013.01); *B60R 2011/0017* (2013.01)

(58) Field of Classification Search
CPC ................................................. B60R 2011/0017
USPC .................................................. 224/275, 427
See application file for complete search history.

(56) References Cited

U.S. PATENT DOCUMENTS

| | | | |
|---|---|---|---|
| 4,383,626 | A | 5/1983 | Weinblatt |
| 4,630,821 | A | 12/1986 | Greenwald |

(Continued)

FOREIGN PATENT DOCUMENTS

| | | | |
|---|---|---|---|
| JP | 310476 | A | 1/1991 |
| JP | 550883 | A | 3/1993 |

OTHER PUBLICATIONS

Soviero, Marcelle M., "TV for Cars," Popular Science, Dec. 1990, pp. 88-89.

*Primary Examiner* — Brian D Nash
*Assistant Examiner* — Derek Battisti
(74) *Attorney, Agent, or Firm* — Fredrikson & Byron, P.A.

(57) ABSTRACT

A monitor-mounting system for a headrest of a land vehicle includes a bushing subsystem constructed to be coupled to the headrest; and a monitor-mounting plate constructed to be coupled to the bushing subsystem. The monitor-mounting region extends outwardly of the headrest and is constructed for fixedly receiving a monitor. The headrest is constructed with dual posts and dual post guides, and the bushing system is constructed with dual bushings, each being constructed to couple to a corresponding one of the dual post guides, or to a corresponding one of the posts.

19 Claims, 4 Drawing Sheets

(56) References Cited

U.S. PATENT DOCUMENTS

| | | |
|---|---|---|
| 4,635,110 A | 1/1987 | Weinblatt |
| 4,647,980 A | 3/1987 | Steventon et al. |
| 4,843,477 A | 6/1989 | Mizutani et al. |
| 4,866,515 A | 9/1989 | Tagawa et al. |
| 4,982,996 A | 1/1991 | Vottero-Fin et al. |
| 5,009,384 A | 4/1991 | Gerke et al. |
| 5,179,447 A | 1/1993 | Lain |
| 5,311,302 A | 5/1994 | Berry et al. |
| 5,338,081 A | 8/1994 | Young et al. |
| 5,359,349 A | 10/1994 | Jambor et al. |
| D356,081 S | 3/1995 | Naito et al. |
| 5,397,160 A | 3/1995 | Landry |
| 5,547,248 A | 8/1996 | Marechal |
| 6,315,180 B1 | 11/2001 | Watkins |
| 6,619,605 B2 | 9/2003 | Lambert |
| 7,201,443 B2 | 4/2007 | Cilluffo et al. |
| 8,016,353 B2 * | 9/2011 | Kuno .................. 297/217.3 |
| 2003/0121943 A1 | 7/2003 | Chou |
| 2004/0016782 A1 | 1/2004 | Hsu |
| 2006/0087163 A1 | 4/2006 | Cilluffo et al. |
| 2007/0222248 A1 | 9/2007 | Maulden et al. |
| 2009/0315368 A1 * | 12/2009 | Mitchell ................ 297/188.04 |
| 2010/0090076 A1 * | 4/2010 | Brawner .................. 248/224.8 |
| 2011/0233245 A1 * | 9/2011 | Singh ..................... 224/275 |
| 2012/0018471 A1 * | 1/2012 | Guillermo et al. .......... 224/275 |

\* cited by examiner

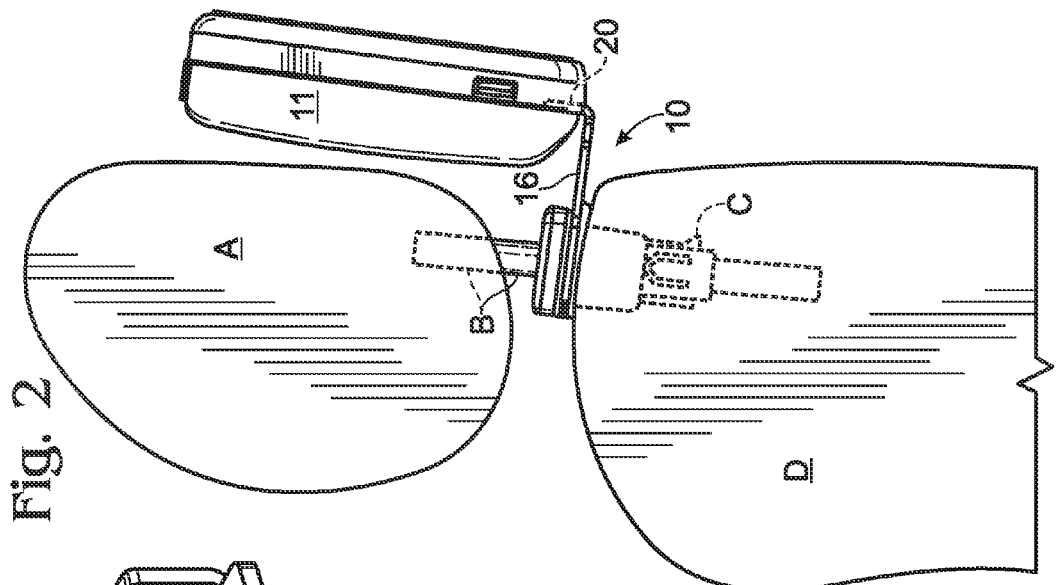
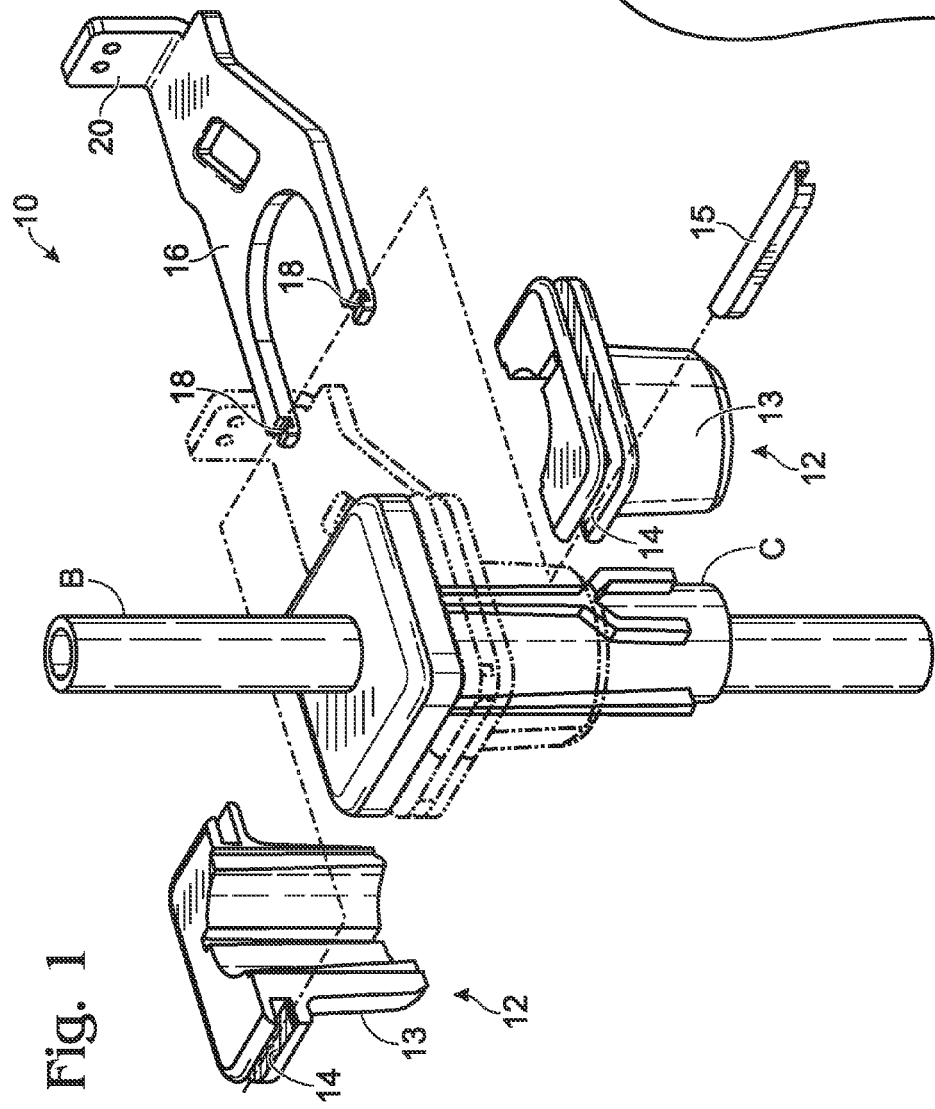

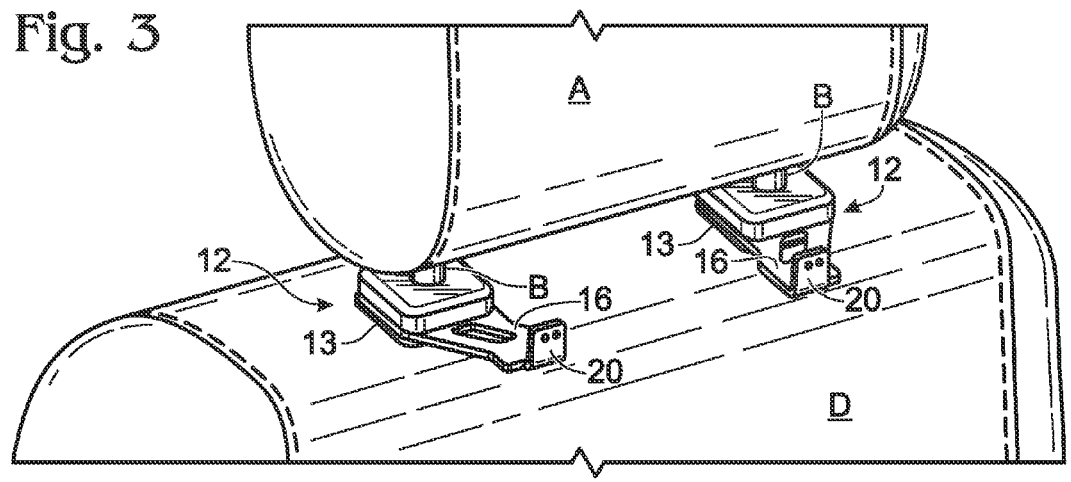
Fig. 3
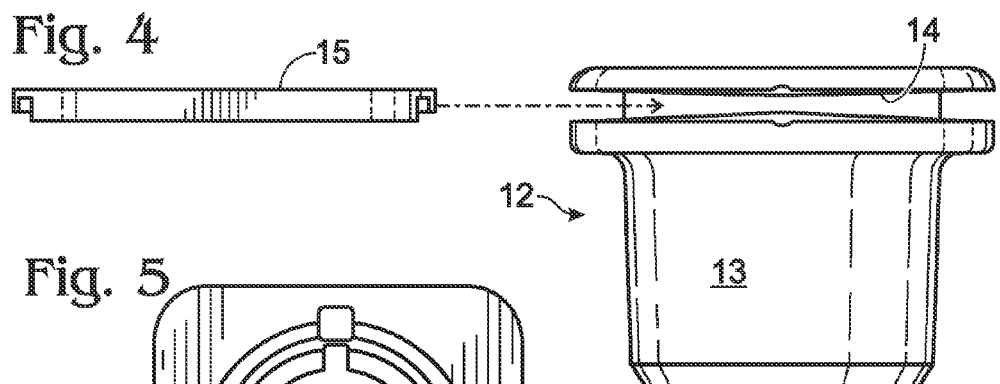
Fig. 4
Fig. 5
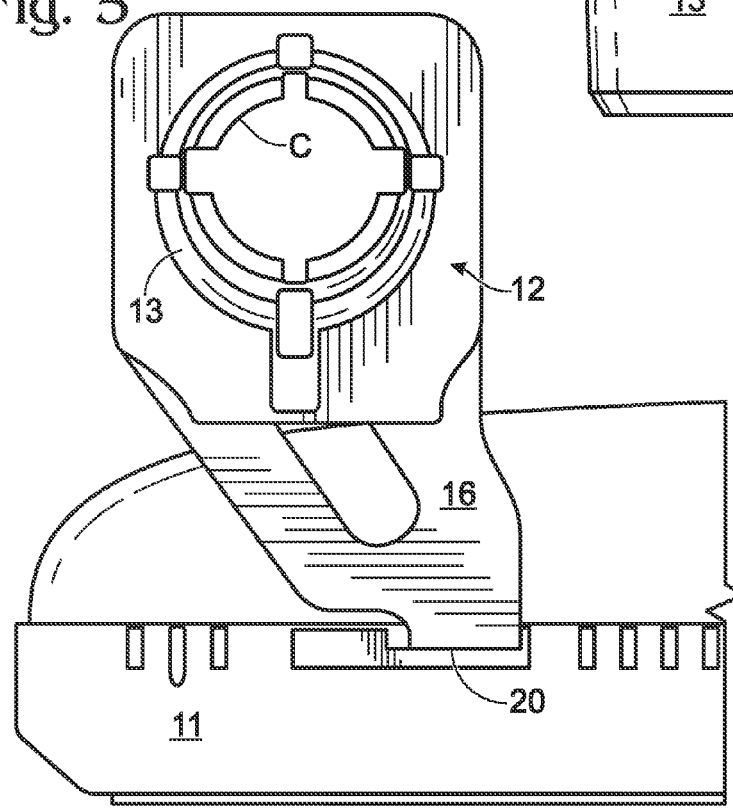

MONITOR-MOUNTING SYSTEM FOR A LAND VEHICLE HEADREST

CROSS-REFERENCES TO RELATED APPLICATIONS

This application is a continuation of U.S. patent application Ser. No. 14/076,683, filed Nov. 11, 2013 and entitled "Monitor-Mounting System for a Land Vehicle Headrest", which application is a continuation of U.S. patent application Ser. No. 13/743,138, filed Jan. 16, 2013 and entitled "Monitor-Mounting System for a Land Vehicle Headrest", which application is a continuation of U.S. patent application Ser. No. 12/939,162, filed Nov. 3, 2010 and entitled "Monitor-Mounting System for a Land Vehicle Headrest", which application claims priority to U.S. Provisional Patent Application Ser. No. 61/257,780, filed Nov. 3, 2009 and entitled "Monitor Mount for an Automobile Headrest" and U.S. Provisional Patent Application Ser. No. 61/257,777, filed Nov. 3, 2009 and entitled "Monitor Mount for an Automobile Headrest", which are both incorporated herein by reference in their entirety for all purposes.

TECHNICAL FIELD

The invention relates to monitor mounting systems for land vehicle headrests and, more particularly, to monitor mounting systems constructed to be coupled to OEM headrest post guides and headrest posts.

BACKGROUND

Land vehicle entertainment systems have been popular for many years and, in recent years there has been a growing demand for monitor systems that can be mounted inside the back of a vehicle headrest. Conventional systems involve modifying the headrest so that a monitor, typically one with a DVD player built into the housing of the monitor, can be fitted into a recess formed in the back of the headrest. These systems require substantial changes to the headrest so that the monitor can be fitted into it, or they require complete substitution of the original headrest with one that contains a monitor in a back region of the substitute headrest. In conventional systems, the monitor is constructed to pivot so that it reveals a slot for insertion of a DVD. Examples of such conventional systems can be seen on the Internet at www.gualitymobilevideo.com/headrest-monitors.aspx.

BRIEF DESCRIPTION OF THE DRAWINGS

FIG. 1 is an exploded, isometric view of an embodiment of the invention.

FIG. 2 is a side view of the embodiment shown in FIG. 1, that also shows how the invention looks with the vehicle posts and post guides in position in a vehicle seat and vehicle headrest.

FIG. 3 is a back view of a vehicle seat and headrest after the embodiment of the invention shown in FIG. 1 has been coupled to the headrest post guides.

FIG. 4 is a side view of certain components of the embodiment shown in FIG. 1.

FIG. 5 is a fragmentary, bottom view of the embodiment shown in FIG. 1.

DETAILED DESCRIPTION

Figure 6:
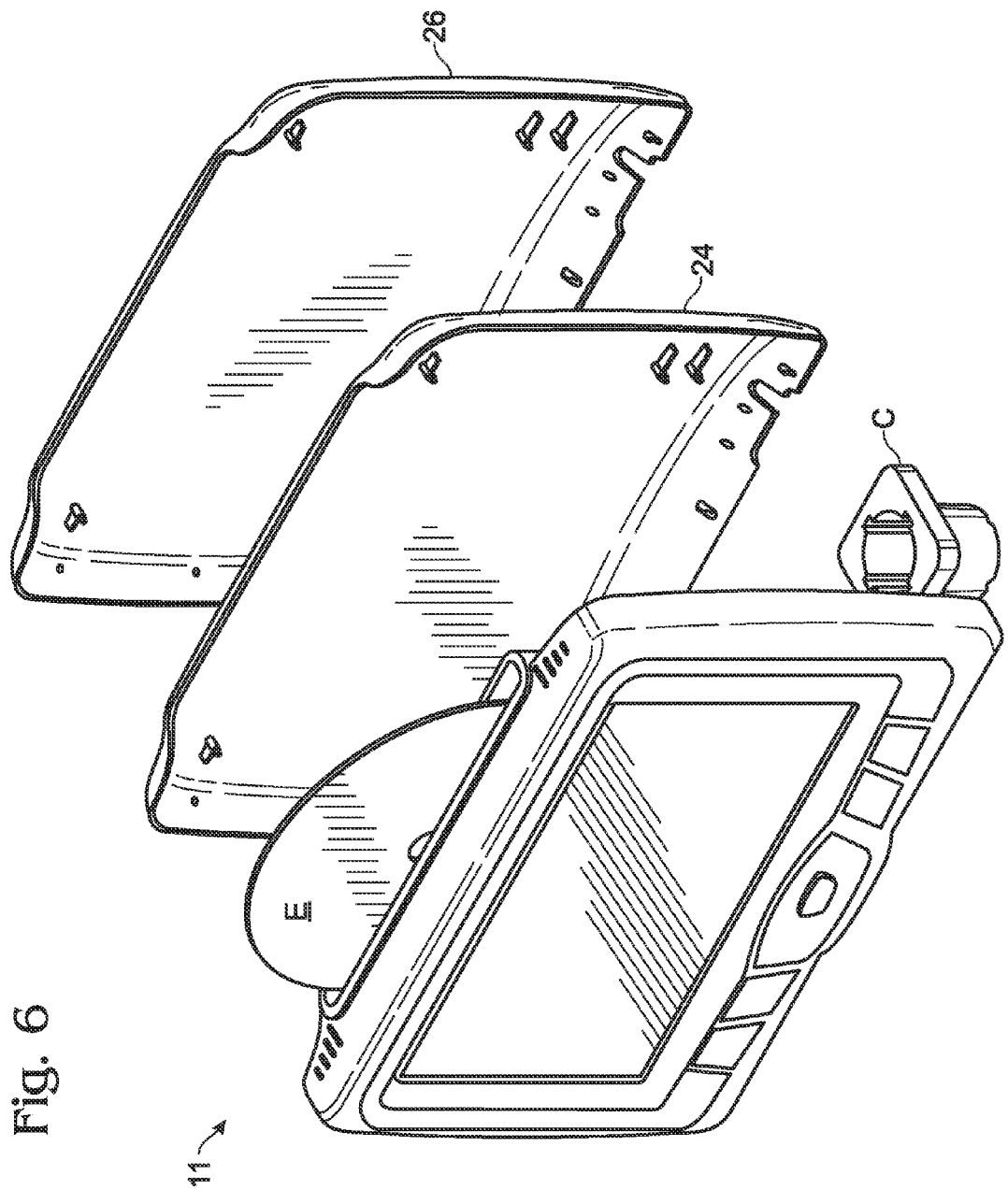
FIG. 6 is a fragmentary, exploded of certain components of the embodiment in FIG. 1.

As will be described below with reference to the drawings, the invention includes a monitor-mounting system that can be used to attach a monitor to a land vehicle headrest without having to change the component of that headrest that is designed to provide a body for resting the passenger's or driver's head against. As used herein, a vehicle headrest includes a body at a top region of the headrest, with dual posts that extend downwardly from the body through post guides that are positioned in a vehicle seat. These components of a headrest are not part of the invention, but are shown, for example, in FIGS. 2-3 and 7-8.

Preliminary to discussing further details of the invention, it should be understood that the monitor-mounting system can be used with any suitable monitor, such as a suitable LCD monitor, with integrated DVD player. Such LCD monitors, with suitable wiring for connecting to a vehicle power system can be obtained from Rosen Entertainment Systems of Corona, Calif. A version of the invention may be obtained from Rosen Entertainment Systems and it is marketed under the trademark AV7700.

Referring to FIGS. 1-6, an embodiment of the invention is shown after the bushing subsystem 12 has been coupled around the outside of the post guides B of a conventional vehicle headrest 1. The vehicle headrest 1 is constructed with dual posts B and dual post guides C like the single post B and guide C shown in FIG. 1. The bushing system is constructed with dual bushings 13, or bushing halves 13, like those shown and described in connection with FIG. 5 below, with each being constructed to couple to a corresponding one of the dual post guides C.

FIGS. 1-6 show details of the monitor-mounting system 10, which includes a bushing subsystem 12 as the two bushing halves 13 that are shown in an exploded view away from a fragmentary section of a conventional headrest post B that is positioned through a conventional post guide C (as shown and described with respect to in FIG. 1). The bushing subsystem 12 is constructed to be coupled to the headrest 1. In this embodiment, that coupling occurs by bringing the two bushing halves 12 together around each post guide C, one of which is depicted in FIG. 5 and, and under the cap of the post guide C which is shown as the topmost region of that post guide C (e.g., see FIG. 2).

Referring again to FIG. 1, a monitor-mounting plate 16, 20 (shown exploded from the conventional headrest post B and post guide C) is constructed to be coupled to the bushing subsystem 12, and it includes dual forks 16 and a monitor-mounting region 20 (the region shown at the far rights that includes a flat, horizontal section 16 and an upright section 20 with holes formed therein for receiving suitable fasteners that attach a monitor (undepicted) to that upright region 20. As shown in FIGS. 1, 2, 3 and 6, the monitor-mounting plate 16, 20 extends outwardly of the headrest 1 and is constructed for fixedly receiving a monitor 11 via the monitor-mounting region 20.

A locking piece 15 (also referred to as a locking metal piece) is also shown in FIGS. 1 and 4, and it is used to lock the monitor-mounting plate 16, 20 in position (e.g., via sliding lock 15 into channels 18) after the forks have been moved into the channels 14 formed in the bushing halves 13. By placing the monitor-mounting plate 16, 20 in those channels 14, the bushing halves 13 are held together. By placing the shown locking metal piece 15 through the channel 14 of the bushing halves 13 as shown in FIG. 4, and placing the locking metal piece 15 also through channels 18 of the monitor-mounting plate 16, 20, the monitor-mounting plate 16, 20 is secured and capable of holding a monitor 11 in a desired position for viewing by vehicle back seat passengers (undepicted).

Concerning materials for the inventions, any suitable material may be used, including metal and composite materials.

FIG. 2 shows illustrations of the monitor-mounting system of the invention after being coupled to a conventional vehicle headrest 1 and after the monitor-mounting region 20 of the monitor-mounting plate 16, 20 has been fastened to a monitor 11.

FIGS. 3 and 5 shows additional illustrations of a monitor 11 after it has been attached to the invention, but without showing the conventional headrest posts and/or post guides.

Figure 7:
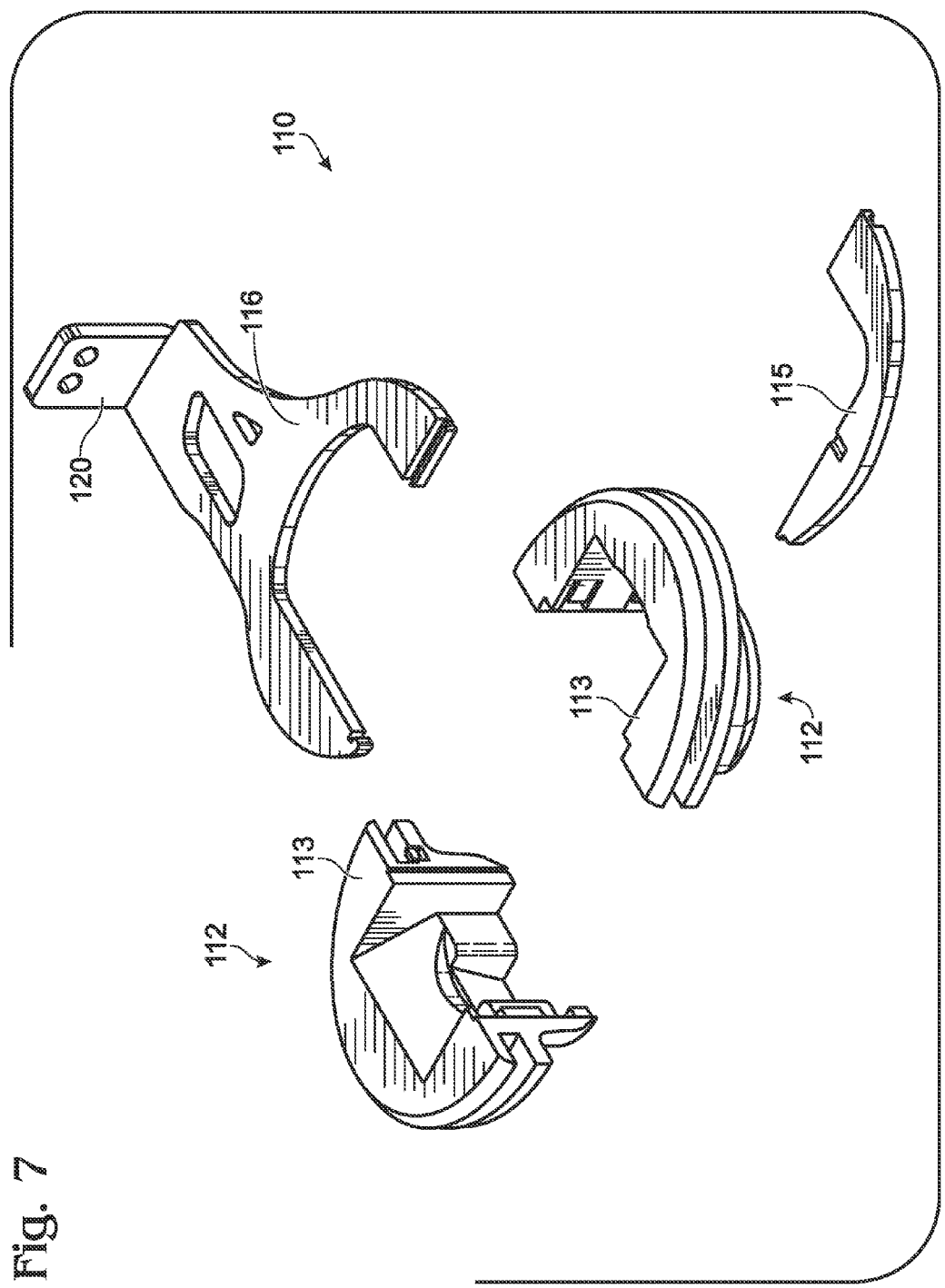
FIG. 7 is an exploded view of another embodiment of the invention.

FIG. 7 is directed to two more embodiments of the invention, including dual bushing halves 113 with interior surfaces that have been formed to match the outer surface of a conventional headrest post guide (e.g., C in FIG. 1). Those bushing halves 113 have bodies that are formed with an oval shape. The oval-shaped embodiment could alternately be employed as another embodiment that is square shaped. In each of the embodiments described with respect to FIG. 7, the locking metal piece 115 is shown extending towards the corresponding channels (e.g., like channel 14 in FIG. 1) of the bushing halves 113 to illustrate that they slide into place.

In some embodiments of the invention that are also designed for use with the conventional headrest 1 described above, only that this embodiment includes a bushing subsystem that is constructed with dual bushings, or bushing halves (e.g., like 13 in FIG. 1), each being constructed to couple to a corresponding one of the dual posts B. Similar to the embodiment of FIG. 1, this embodiment also includes a bushing subsystem and a monitor-mounting plate. That plate includes a U-shaped end that can be moved into the channels (e.g., like channel 14 in FIG. 1) of the bushing halves 13. A locking piece (e.g., like 15 in FIG. 1) can be slid into a corresponding channel (e.g., like 18 in FIG. 1) after the monitor-mounting plate is slid into position through the channels (e.g., like 14 in FIG. 1) of the bushing halves. In some embodiments, the bushing halves may have any desired size, such as 10 mm, 11 mm, 12 mm, 12.7 mm, and 14 mm. It is intended that the monitor-mounting plate (e.g., 16, 20) remain the same size for all versions of this embodiment. This embodiment attaches to the conventional headrest post B, as opposed to the post guide C, as the other embodiments discussed above do.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

I claim:

1. A monitor-mounting system for coupling a monitor to a headrest of a vehicle, the headrest including a post for insertion into a post guide, the monitor-mounting system comprising:
    a bushing subsystem comprising a plurality of bushing elements configured to be coupled around the post guide, each of the bushing elements having a channel arranged such that when the bushing elements are coupled around the post guide the channels form a perimeter channel of the bushing subsystem;
    a monitor-mounting plate configured to receive attachment of the monitor, the monitor-mounting plate formed to be insertable into the perimeter channel along a first axis, the monitor-mounting plate further comprising a first groove; and
    a locking piece configured for locking engagement with the mounting plate to couple the bushing elements to the post guide, the locking piece formed to be insertable into the perimeter channel along a second axis that is different from the first axis, the locking piece further comprising a second groove that is formed complimentary to the first groove to engage and interlock the locking piece to the monitor-mounting plate.

2. The monitor-mounting system of claim 1, the headrest including a second post for insertion into a second post guide of the seat, the monitor-mounting system further comprising:
    a second bushing subsystem comprising a plurality of second bushing elements configured to be coupled around the second post guide, each of the second bushing elements having a channel arranged such that when the second bushing elements are coupled around the second post guide the channels of the second bushing elements form a perimeter channel of the second bushing subsystem;
    a second monitor-mounting plate configured to receive attachment of the monitor, the second monitor-mounting plate formed to be insertable into the perimeter channel of the second bushing subsystem along the first axis, the second monitor-mounting plate further comprising a first groove; and
    a second locking piece configured for locking engagement with the second mounting plate to couple the second bushing elements to the second post guide, the second locking piece formed to be insertable into the perimeter channel of the second bushing subsystem along the second axis, the second locking piece further comprising a second groove that is formed complimentary to the first groove of the second mounting plate to engage and interlock the second locking piece to the second monitor-mounting plate.

3. The monitor-mounting system of claim 1, wherein a portion of the bushing subsystem that interfaces with the post guide extends along a longitudinal axis of the bushing subsystem from an upper end of the bushing to a lower end of the bushing, and wherein the perimeter channel is arranged along a plane that is perpendicular to the longitudinal axis.

4. The monitor-mounting system of claim 1, wherein the locking piece and the mounting plate are configured to surround the perimeter channel.

5. The monitor-mounting system of claim 1, wherein the locking piece and the mounting plate provide locking engagement with each other via a sliding motion relative to each other, and wherein the first axis is perpendicular to the second axis.

6. The monitor-mounting system of claim 1, wherein the monitor-mounting plate includes a fork-shaped portion.

7. The monitor-mounting system of claim 1, wherein the bushing elements are formed as two bushing elements.

8. The monitor-mounting system of claim 1, wherein the two bushing elements are formed as two bushing halves.

9. The monitor-mounting system of claim 1, wherein the bushing elements have interior surfaces that are formed to match the outer surface of the post guide.

10. The monitor-mounting system of claim 1, wherein the monitor-mounting plate holds the bushing elements together around the post guide.

11. A method of installing a monitor-mounting system to a headrest of a vehicle, the headrest including a post for insertion into a post guide, the method comprising:
providing a monitor-mounting system including:
a bushing subsystem comprising a plurality of bushing elements configured to be coupled around the post guide, each of the bushing elements having a channel arranged such that when the bushing elements are coupled around the post guide the channels form a perimeter channel of the bushing subsystem;
a monitor-mounting plate configured to receive attachment of the monitor, the monitor-mounting plate formed to be insertable into the perimeter channel, the monitor-mounting plate further comprising a first groove;
a locking piece configured for locking engagement with the mounting plate to couple the bushing elements to the post guide, the locking piece formed to be insertable into the perimeter channel, the locking piece further comprising a second groove that is formed complimentary to the first groove;
placing each of the bushing elements around the post guide;
inserting the monitor-mounting plate into the perimeter channel along a first axis; and
inserting the locking piece into the perimeter channel along a second axis that is different than the first axis and engaging the first groove with second groove to fixedly couple the locking piece to the monitor-mounting plate, thereby fixedly coupling the bushing elements to the post guide.

12. The method of claim 11, wherein the headrest includes a second post for insertion into a second post guide, the method further comprising:
providing a second bushing subsystem according to the bushing subsystem of claim 11 including second bushing elements forming a perimeter channel of the second bushing subsystem, a second monitor-mounting plate having a first groove and second locking piece having a second groove;
placing each of the second bushing elements around the second post guide;
inserting the second monitor-mounting plate into the perimeter channel of the second bushing subsystem along the first axis; and
inserting the second locking piece into the perimeter channel of the second bushing subsystem along the second axis and engaging the first groove of the second monitor-mounting plate with the second groove of the second locking piece to fixedly couple the second locking piece to the second monitor-mounting plate, thereby fixedly coupling the second bushing elements to the second post guide.

13. The method of claim 11, wherein the locking piece and the mounting plate provide locking engagement with each other via a sliding motion relative to each other, and wherein the first axis is perpendicular to the second axis.

14. The method of claim 11, wherein a portion of the bushing subsystem that interfaces with the post guide extends along a longitudinal axis of the bushing subsystem from an upper end of the bushing to a lower end of the bushing, and wherein the perimeter channel is arranged along a plane that is perpendicular to the longitudinal axis.

15. The method of claim 11, wherein the locking piece and the mounting plate are configured to surround the perimeter channel.

16. The method of claim 11, wherein the monitor-mounting plate includes a fork-shaped portion.

17. The method of claim 11, wherein the bushing elements are formed as two bushing elements.

18. The method of claim 11, wherein the two bushing elements are formed as two bushing halves.

19. The method of claim 11, wherein the bushing elements have interior surfaces that are formed to match the outer surface of the post guide.

* * * * *